July 3, 1928.
O. FEICK
1,676,015
SPORTING APPARATUS
Filed June 30, 1926
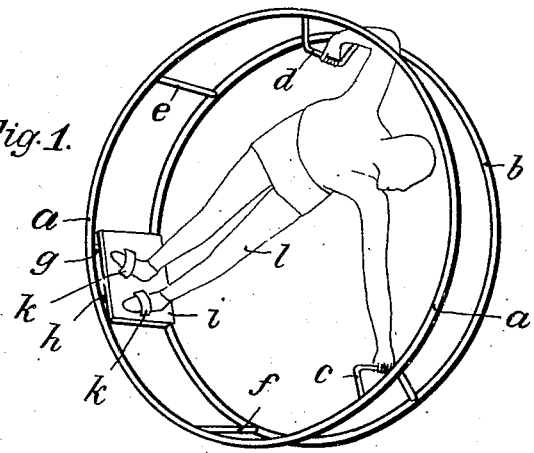
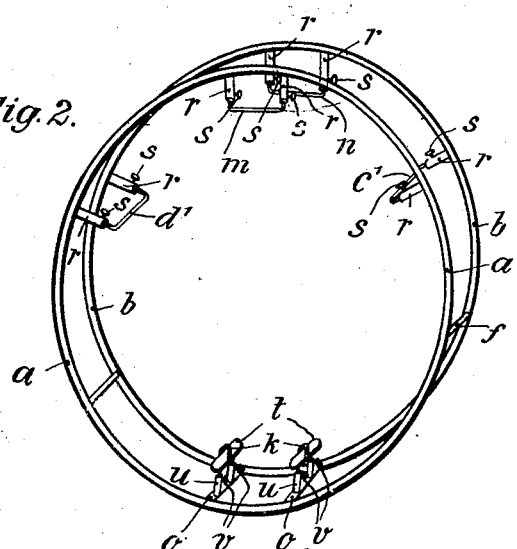
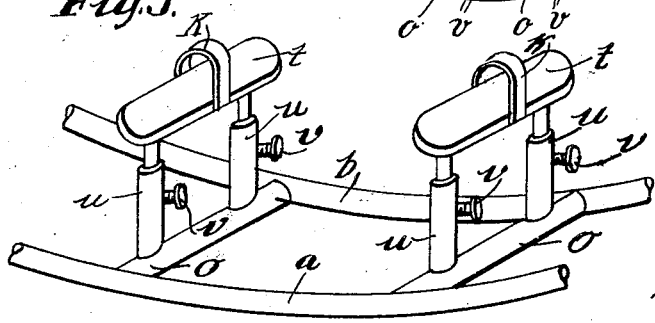
O. Feick
inventor
By Marks & Clark
Attys Patented July 3, 1928.

1,676,015

UNITED STATES PATENT OFFICE.

OTTO FEICK, OF SCHONAU-ON-THE-BRENZ, GERMANY.

SPORTING APPARATUS.

Application filed June 30, 1926, Serial No. 119,763, and in Germany November 7, 1925.

My invention relates to an entirely new sporting apparatus and the object of my invention is to provide a sporting apparatus for male and female persons and even for children and which will afford to the sporting persons an opportunity of exercising and developing all of the muscles of the human body, as far as this can be done, at the same time and in a like manner.

I am aware of the fact that gymnastic and sporting apparatus for similar purposes are known but as far as my knowledge goes, they are not intended nor adapted for exercises capable of engaging and developing all or most of the muscles of the human body so that a partial training of the muscular system only will be obtained or, in other words, a limited number of muscles only will be exercised and developed. In contradistinction thereto my invention ensures, as above intimated, a co-operating actively of all or most of the muscles of the human body available for training exercises.

With the above indicated object in view, the apparatus embodying my invention comprises two hoops interconnected in parallel relationship by means of tie-rods or bars adapted or shaped to form a means for supporting a person within the cylindrical space between the planes of the two hoops, and for the hands of the person to catch hold of the same.

With the above recited object reference is had to the following specification and drawings in which there are exhibited two examples or embodiments of the invention which are in no way intended as a limitation upon the scope of the appended claims as it is to be clearly understood that variations and modifications which properly fall within the true scope of said claims may be resorted to when found expedient.

In the accompanying drawings forming a part of this specification: Figure 1 is a perspective view of the one embodiment of the invention illustrating the apparatus diagrammatically and with a person supported therein in order to convey to the reader a clear idea of the manner in which the apparatus is to be used; Figure 2 is a similar view showing the other embodiment of the invention and Figure 3 shows a detail.

Referring to Figure 1 the apparatus comprises two hoops $a$ and $b$ of like diameters. Although the dimensions of the apparatus are not essential and may be varied as required or desired, still it may be mentioned that hoops having a diameter of an average length of say about two metres will suit in most cases. The hoops are connected with each other by a number of rods or traverses $c$, $d$, $e$, $f$, $g$, $h$ so as to form a rigid structure. In the embodiment shown the rods $c$ and $d$ are bent twice or shaped to form radially inwards projecting bridles or handles for the hands of the sporting person to hold fast to the apparatus, as will be readily understood on inspection of Figure 1. The two rods or traverses $g$ and $h$ support a plate $i$ rigidly connected therewith and equipped with leather straps $k$ or the like for the feet of the person to engage therein, as clearly shown.

I shall now proceed to describe the manner in which the apparatus is used by a person $l$. The latter takes his stand on the plate $i$ with his feet in the straps $k$ and with his hands holding fast to the handles $c$ and $d$. By moving and turning his body in different suitable directions he will cause the apparatus or wheel to revolve on the ground so that he will successively occupy varied positions in the wheel such as upright or horizontal postures or with the head downwards and the like.

It is evident that a sporting wheel of this kind is a useful apparatus for preparatory exercises in connection with aviation. It is possible to attain, by daily routine a high degree of perfection and to come to considerable revolving speeds, but it goes without saying that a great deal of skill and presence of mind is required in order to come to a highest degree of perfection in running a wheel of this kind.

The modification of the apparatus depicted in Figures 2 and 3 is adapted to be used by adults and by children or small people without requiring to be reduced in size. To this end the handles and the foot-supports are constructed and arranged so as to be adjustable in radial direction, preferably by employing tubes with set screws for the purpose as will be described hereinafter more in detail.

Another feature of the modification shown in Figures 2 and 3 resides in the provision of handles projecting radially upwards in the planes of the hoops, whereas in Figure 1 each handle connects the two hoops together so as to radially project into and through the cylindrical space between the two hoops.

Obviously the apparatus shown in Figure 1 may likewise be equipped with both types or either type of handles just as the modification illustrated in Figure 2 is not limited to the exclusive provision of both types of handles. The provision of a handle or pairs of handles in the plane of the individual hoop affords a useful means for the performance of exercises in which the upper part of the body will be turned with relation to the lower part of the body of the exercising person.

In the modification shown in Figures 2 and 3 the two hoops *a* and *b* are rigidly interconnected by rods or ties *e*, *f* and *o*. Cross-handles *c'* and *d'* are provided to interconnect the two hoops in the same manner as described with reference to Figure 1 and, moreover, the hoops *a* and *b* each provided with a handle *m* and *n*, respectively the two handles *m* and *n* are arranged in opposing and parallel relationship, that is to say in planes vertical to the planes of the handles *c'* and *d'*.

The several handles consist each of two short tubes *r* rigidly connected or integral with one hoop or, alternatively, the two hoops and having a set screw *s*, and of a V-shaped rod which is the handle, properly speaking, and which is inserted with its two shanks into the said two tubes. It will be seen that by inserting the rod or handle more or less far into the tubes the former can be adjusted to the proper position, as required or desired, and that the same can be fixed in the adjusted position by means of the set screw *s*.

In a similar manner the supporting rods or ties *o*, *o* are provided with two pairs of short tubes *u*, see Figure 3, rigidly connected or integral with the said plate. The pedals *t* are each provided with two short rods engaging in the tubes *u* and provided with suitable leather straps *k* or the like. The pedals are fixed in their adjusted positions by means of set screws *v*. Preferably I mount the pedals *t* so as to have them lie transverse to the tread of the wheel, as shown in Figure 3 but they may just as well be arranged in the direction of the tread.

It will be evident that my invention, whilst still being adhered to in its main essentials, may be varied and adapted in many ways according to the requirements desired or most suitable under different circumstances.

What I claim is:—

1. A sporting apparatus, including a pair of hoop-like elements, ties connecting and maintaining the hoop-like elements in spaced relation, and means so arranged about the circumference of the hoop-like elements for receiving the limbs of a person that the latter may maintain an upright standing position during rolling motion of the hoop-like element, said last mentioned means including a foot plate and holder.

2. A sporting apparatus as claimed in claim 1 characterized in that the last mentioned means includes handles disposed in the plane of the hoop like elements.

3. A sporting apparatus as claimed in claim 1 characterized in that the last mentioned means includes handles disposed in the plane of the hoop like elements, and arranged inwardly of the latter.

4. A sporting apparatus as claimed in claim 1 characterized in that the last mentioned means includes foot rests and foot holders associated with the foot rests.

5. A sporting apparatus as claimed in claim 1 characterized in that the last mentioned means includes adjustable foot rests.

6. A sporting apparatus as claimed in claim 1 characterized in that the last mentioned means includes a foot rest at one point on the hoop like elements, and hand grips on the hoop like elements at a point removed from the foot rests.

7. A sporting apparatus as claimed in claim 1 characterized in that the last mentioned means includes adjustable hand grips.

8. A sporting apparatus as claimed in claim 1 characterized in that the last mentioned means includes adjustable hand grips, certain of the hand grips being arranged in the plane of the hoops and others at right angles thereto.

9. A sporting apparatus as claimed in claim 1 characterized in that the last mentioned means includes adjustable hand grips and adjustable foot rests carried by the hoop like elements.

10. A sporting apparatus as claimed in claim 1 characterized in that the last mentioned means includes adjustable hand grips, certain of the hand grips being arranged in the plane of the hoops and other perpendicularly thereto, and adjustable foot rests carried by the hoop like elements.

11. A sporting device including spaced hoop like elements, socket members carried by the hoop like members, and limb engaging members adjustably fitted in said sockets.

12. A sporting apparatus as claimed in claim 11 characterized by the provision of means to adjustably secure the limb engaging member in adjusted position.

In testimony whereof I affix my signature.

OTTO FEICK.